US 9,850,989 B2

(12) United States Patent
Cowen et al.

(10) Patent No.: US 9,850,989 B2
(45) Date of Patent: Dec. 26, 2017

(54) COMPLIANT TENSIONER ARM

(71) Applicant: Schaeffler Technologies AG & Co. KG, Herzogenaurach (DE)

(72) Inventors: Gregory Cowen, Windsor (CA); Ryan Duffy, Royal Oak, MI (US); Lucian Botez, Novi, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 141 days.

(21) Appl. No.: 14/887,651

(22) Filed: Oct. 20, 2015

(65) Prior Publication Data
US 2016/0116030 A1    Apr. 28, 2016

Related U.S. Application Data

(60) Provisional application No. 62/066,975, filed on Oct. 22, 2014.

(51) Int. Cl.
*F16H 7/08* (2006.01)
(52) U.S. Cl.
CPC ....... *F16H 7/08* (2013.01); *F16H 2007/0806* (2013.01); *F16H 2007/0872* (2013.01); *F16H 2007/0893* (2013.01)

(58) Field of Classification Search
CPC ............... F16H 7/08; F16H 2007/0806; F16H 2007/0872; F16H 2007/0893
See application file for complete search history.

(56) References Cited

U.S. PATENT DOCUMENTS

| | | | |
|---|---|---|---|
| 6,716,124 B2 * | 4/2004 | Markley | F16H 7/0848 474/109 |
| 6,889,642 B2 * | 5/2005 | Fink | F16H 7/08 123/90.17 |
| 7,018,312 B2 * | 3/2006 | Sonobata | F16H 7/0848 474/111 |
| 7,074,146 B2 * | 7/2006 | Fujikubo | F16H 7/0848 474/111 |
| 2002/0042315 A1 * | 4/2002 | Poiret | F16H 7/08 474/111 |

FOREIGN PATENT DOCUMENTS

EP    1441149    7/2004

* cited by examiner

*Primary Examiner* — William E Dondero
*Assistant Examiner* — Robert T Reese
(74) *Attorney, Agent, or Firm* — Volpe and Koenig, P.C.

(57) ABSTRACT

A compliant tensioner arm assembly including an arm, an elastically deformable body disposed on a surface of the arm, and a sliding surface disposed on the elastically deformable body is disclosed. The elastically deformable body allows the sliding surface to yield to a load condition of the sliding surface so that the sliding surface yields to the load condition.

18 Claims, 3 Drawing Sheets

COMPLIANT TENSIONER ARM

INCORPORATION BY REFERENCE

The following documents are incorporated herein by reference as if fully set forth: U.S. Provisional Application No. 62/066,975, filed Oct. 22, 2014.

FIELD OF INVENTION

The present invention relates to a tensioning device for a drive system.

BACKGROUND

Drive systems typically include a flexible drive member, such as a belt or chain, to transfer torque from a drive sprocket to one or more driven sprockets. Under various operating conditions, the tension in the chain can vary greatly, requiring adjustment in chain tension to improve the operating condition of the chain which may improve performance, lessen wear, and reduce noise.

Tensioners are used as a control device for a chain drive in automobile drive systems, for example in an automatic transmission. Temperature and the linear expansion among the various parts of the drive system, as well as wear to the drive system components can produce a decrease in the tension of the chain. A tensioner is used to take up the slack in the chain or belt that connects the drive sprocket and a driven sprocket to adjust the tension in the slack side of a chain.

SUMMARY

In an embodiment of the present invention, a compliant tensioner arm assembly comprises an arm, an elastically deformable body disposed on a surface of the arm, and a sliding surface disposed on the elastically deformable body. The deformable body reacts to a load condition of the sliding surface so that the sliding surface yields to the load condition.

In an embodiment of the present invention, a compliant tensioner arm system comprises an arm supported for rotation about a pivot point, an elastically deformable body disposed on a surface of the arm, a sliding surface disposed on the elastically deformable body, and a resilient extension element coupled to the tensioner arm to provide a rotational force about the pivot point. The deformable body reacts to a load condition of the sliding surface so that the sliding surface yields to the load condition.

Other and further embodiments of the present invention are described below.

Figure 1:
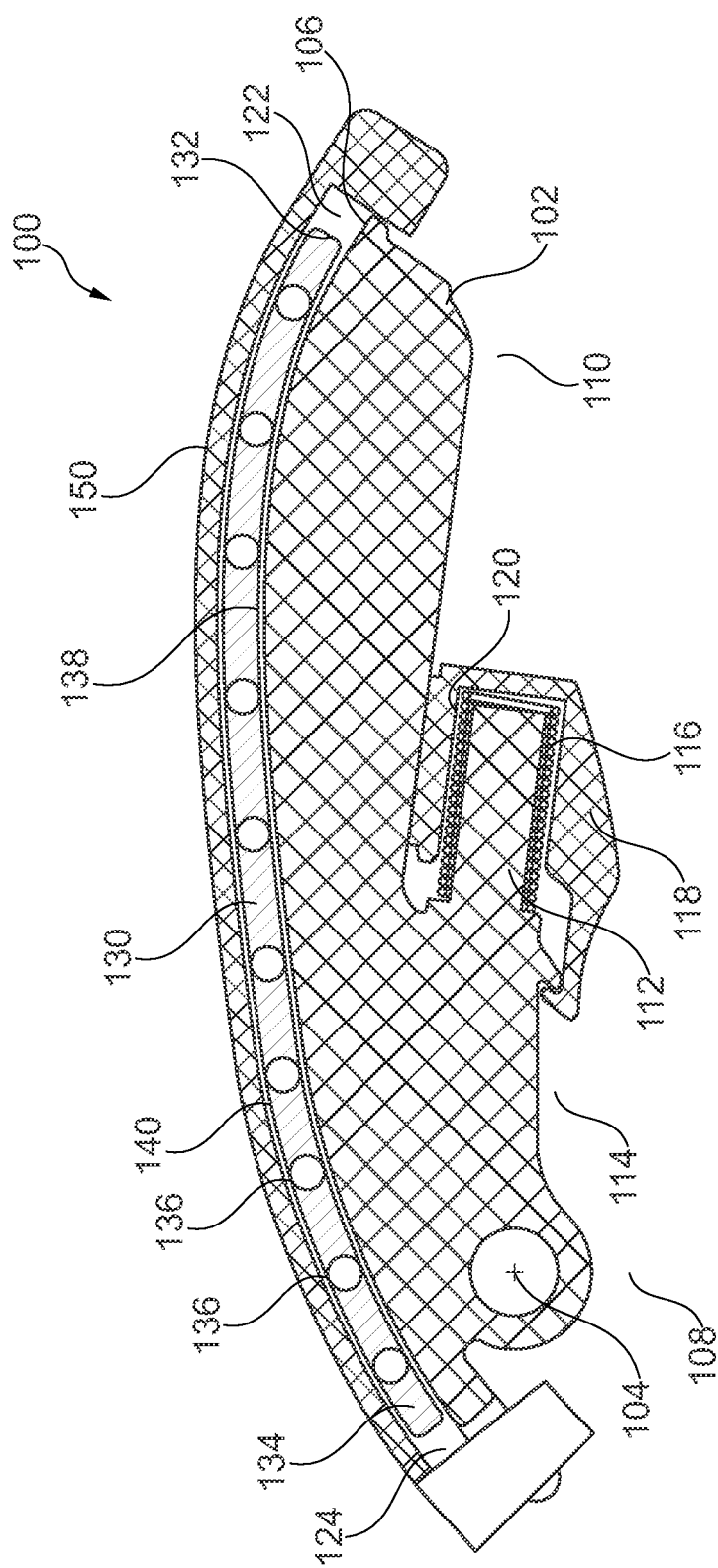
FIG. 1 is a side sectional view of a compliant tensioner arm assembly 100 in accordance with an embodiment of the present invention.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to automotive transmissions, the present invention may be modified for a variety of applications while remaining within the spirit and scope of the claimed invention, since the range of the potential applications is great, and because it is intended that the present invention be adaptable to many such variations.

DETAILED DESCRIPTION

Certain terminology is used in the following description for convenience only and is not limiting. The words "front," "rear", "upper", "lower", "above", and "below" designate directions in the drawings to which reference is made. "Longitudinal axis" and forms thereof refers to a direction along the long axis of a part. The terminology includes the words specifically noted above, derivatives thereof and words of similar import.

FIG. 1 depicts a tensioner arm assembly 100 in accordance with an embodiment of the present invention. The tensioner arm assembly 100 includes a generally elongate arm 102 with a pivot point 104 at a first end 108. The pivot point 104 may be the center point of a through bore as illustrated, the through bore configured to accept a shaft (not shown) to support the arm 102 for rotation about the pivot point 104 which is fixed with respect to a frame of reference. At least an upper portion 106 of the arm 102 has a generally curvilinear shape.

Figure 2:
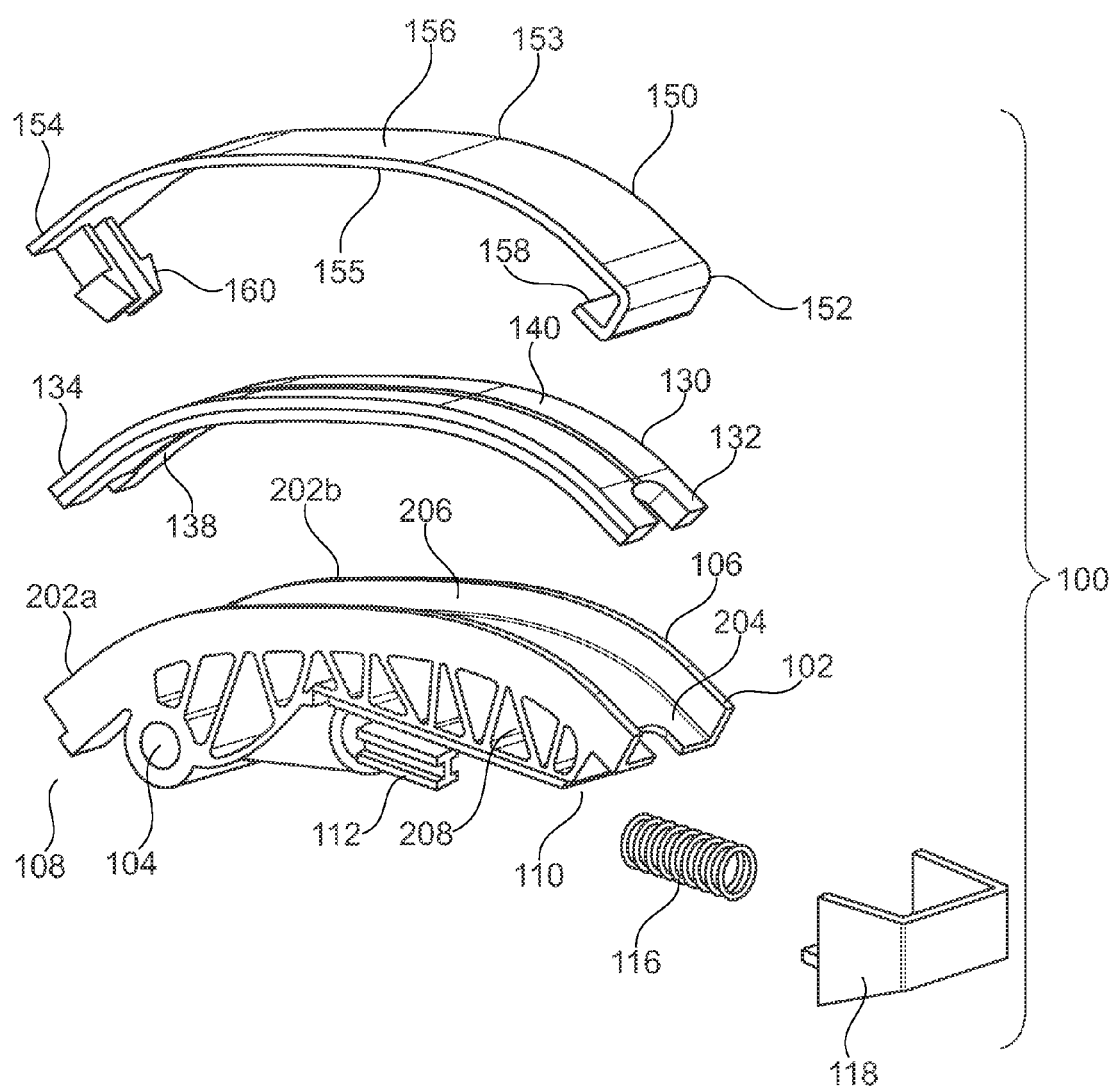
FIG. 2 is an exploded view of the tensioner arm assembly of FIG. 1.

The upper portion 106 of the arm 102 is formed with opposing side walls 202a, 202b and a support surface 204 forming a pocket or recess 206 as shown in FIG. 2. The recess 206 may have an end walls at or near the first end 108 and/or the second end 110.

The arm 102 may be formed from any suitable material, for example plastic or reinforced plastic, aluminum or steel to form a rigid support surface 204. The body of the arm 102 adjacent to and below the recess 206 may be formed by a series of wall segments arranged as a truss-like structure 208, which may beneficially provide sufficient strength and rigidity to at least the support surface 204, while reducing the weight of the arm 102. As used herein, "rigid" means the arm resists deflection when used as intended in a tensioner arm assembly and system.

A projection 112 extends from a lower portion 114 of the arm 102 and is configured to cooperate with a resilient member 116 to urge the arm in rotation about the pivot point 104. The resilient member 116 is illustrated as a compression spring for ease of illustration only. Other elements suitable for urging the arm 102 in rotation may be used, for example a piston and cylinder arrangement. The resilient member 116 is seated at a first end against a portion of the arm 102. A second end of the resilient member is seated against the end wall of a blind hole 120 formed in a portion of a wedge 118. The blind hole 120, resilient member 116, and projection 112 are coaxially arranged and configured to allow axial movement of each member along the common axis. Extension of the resilient member 116 urges the arm to rotate about the pivot point in a counterclockwise direction as illustrated.

Figure 3:
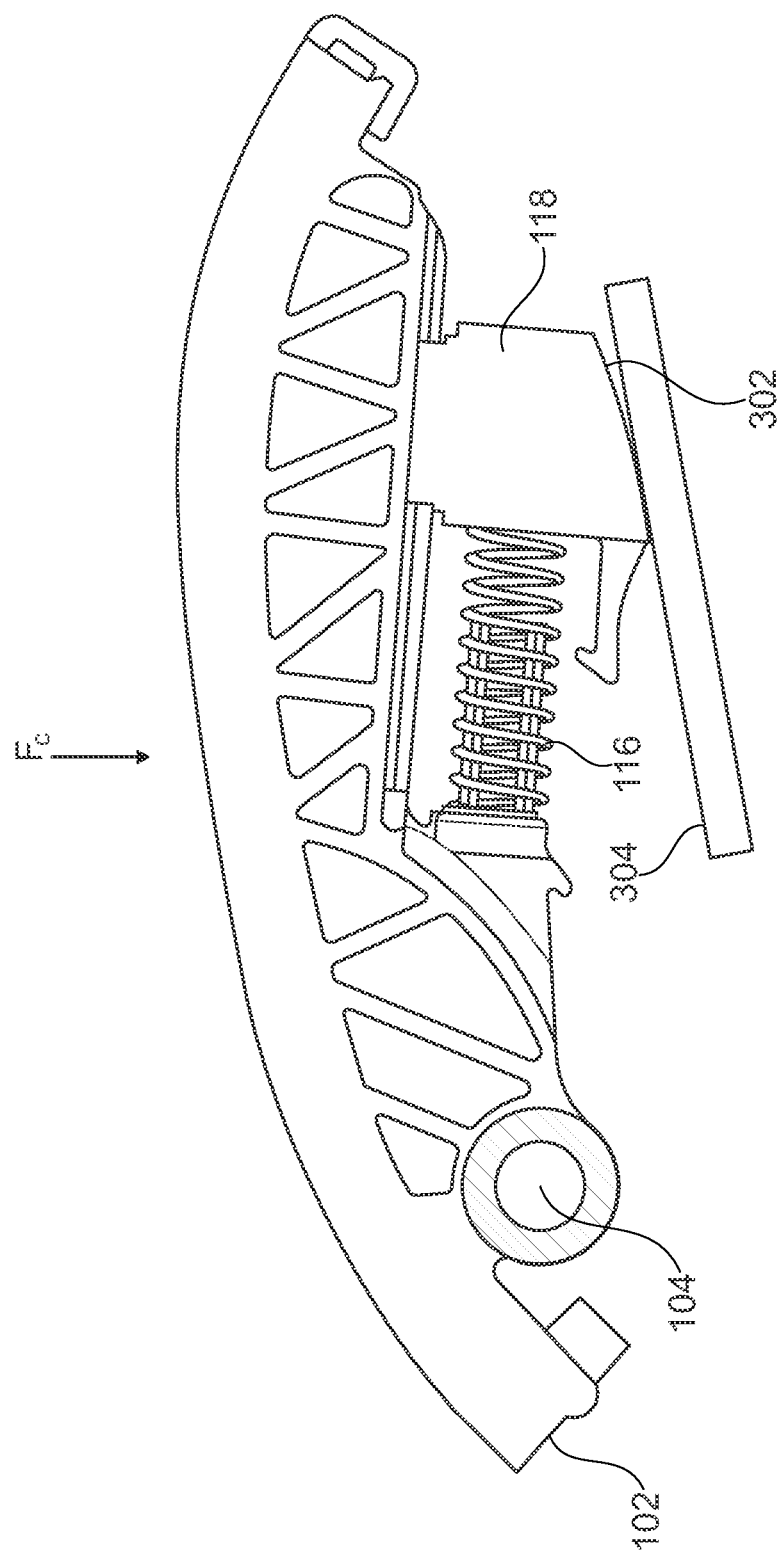
FIG. 3 is a side view of the tensioner arm assembly of FIG. 1.

As shown in FIG. 3, a lower surface 302 of the wedge 118 is supported on an incline plane 304 that is fixed with respect to the same reference as the pivot point 104. The wedge 118, the plane 304, and the resilient member 116 cooperate to advance the arm 102 to take up slack in the chain as it is created in the drive system.

An elastically deformable body 130 is disposed on support surface 204 within the walls 202a, 202b, and end walls if present. A lower surface 138 of the elastically deformable body 130 is formed to closely fit against the support surface 204 and is smaller than the recess 206 in at least the longitudinal length direction. As illustrated in FIG. 1, a space 122, 124 is formed between each of the ends 132, 134 of the elastically deformable body 130 and the longitudinal ends of the recess 206.

The elastically deformable body 130 may be formed with voids 136 formed generally transverse to the longitudinal axis as shown in FIG. 1, or at other angles to the longitudinal axis, for example parallel to the longitudinal axis. Internal cylindrical surfaces define the illustrated voids 136, although voids of other shapes may be similarly formed. The voids 136 may form a honeycomb-like body of the elastically deformable body 130. Alternately, the elastically deformable body 130 may be formed without voids.

The elastically deformable body 130 may be formed as a rubber pad from a natural or synthetic rubber suitable for use in contact with, or immersed in, fluids commonly found in an automotive transmission environment, for example natural or synthetic lubricating oils used in automotive engines or transmissions. In non-limiting examples, the elastically deformable body 130 may be formed from alkyl acrylate copolymer (ACM) or other materials suitable for contact with the fluids similar to those described above in a temperatures range of about −40 degrees C. to 140 degrees C. The elastically deformable body 130 may have a Shore hardness of between 40 and 80, for example 60.

In some embodiments, one or more of the lower or upper surfaces 138, 140 of the elastically deformable body 130 may be formed with a pattern of raised surfaces, for example ribs or bumps, extending away from the top surface 140 of the elastically deformable body 130.

A chain guide 150 is disposed on the upper surface 140 of the elastically deformable body 130 with an outwardly facing sliding surface 156. The chain guide 150 is adapted for attachment to the arm 102 with the elastically deformable body 130 disposed between the arm 102 and the chain guide 150. For example, as shown in the figures, the first end 152 of the chain guide 150 is formed with a U-shaped return 158 to engage a portion of the first end 106 of the arm 102. The second end 154 of the chain guide 150 is formed with an interference fit structure to engage a feature (not shown), for example a through hole, formed at the second end 110 of the arm 102. Other features may be used to secure the chain guide 150 to the arm 102, at, for example, the ends 152, 154 of the chain guide or along the longitudinal edges 153, 155. The sliding surface 156 is adapted to support a chain in a drive system under high temperature conditions in an oil-rich environment as discussed above.

The chain guide 150 may be formed from a low wear and low friction plastic material suitable for use in contact or immersed in the fluids, and at the temperatures, discussed above. Non-limiting examples of suitable materials include polyamides, for example nylon 46 or nylon 66.

Assembled as described above and shown in the figures, the chain guide 150 is above and supported by the upper surface 140 of the elastically deformable body 130. The lower surface 138 of the elastically deformable body 130 is above and supported by the support surface 204 of the arm 102. In practice, the sliding surface 156 of the chain guide 150 is brought into contact with a belt or chain on the slack (i.e., no chain load) side of the drive system according to one embodiment. In another embodiment, the sliding surface 156 of the chain guide 150 is brought into contact with a belt or chain on the tight side (i.e., side with the chain load) of the drive system.

The force provided by the resilient member 116 causes counter clockwise (as drawn) rotation, or forward stroke as drawn, of the tensioner arm 102. The forward stroke presses the sliding surface 156 against the chain at a force determined by the design of the resilient element 116 to deflect and lengthen the path of the chain until the spring force of the resilient member 116 and the slack side chain load are balanced. The path of the chain is thereby lengthened and the slack in the chain is reduced at the slack side to adjust the tension in at least the slack portion of the chain.

When the tight side load decreases and the chain shortens, or when full load reversal occurs so that the slack side becomes tight and the tight side becomes the slack side, the chain will push against the chain guide 150 and ultimately against the arm 102. The wedge 118 is designed so that it will lock in place against the plane 304 due to friction to keep the chain in control at all times. Therefore, when the chain shortens, the slack side chain load will increase. Since the wedge is locked in place, the increase in the chain load may be dramatic, especially under the load reversal, or shock, conditions. It is during the shock conditions that the deformable body 130 deforms to shorten the chain path and reduce the peak load on the chain.

In some systems, such as automotive transmissions, the condition of the slack side of the chain can vary due to many factors, for example, misalignment in assembly, changes in temperature, or changes in the direction of power transmission as may occur during deceleration. The disclosed tensioner arm assembly 100 may beneficially create a compensation for variations in chain load during operation.

What is claimed is:

1. A compliant tensioner arm assembly comprising:
an arm;
an elastically deformable body disposed on a surface of the arm; and
a sliding surface disposed on the elastically deformable body,
wherein the deformable body reacts to a load condition of the sliding surface so that the sliding surface yields to the load condition, wherein one or more internal surfaces define one or more voids within the elastically deformable body.

2. The assembly of claim 1, wherein the elastically deformable body is a rubber pad partially disposed in a recess formed on the surface of the tensioner arm.

3. The assembly of claim 1, wherein the voids are passages formed transverse to a longitudinal axis of the elastically deformable body.

4. The assembly of claim 1, wherein the elastically deformable body includes a pattern of raised surfaces on at least one of a top surface and a bottom surface.

5. The assembly of claim 1, further comprising a resilient extension element coupled to the tensioner arm to provide a rotational force about the pivot point.

6. The assembly of claim 5, further comprising a projection that extends from a lower portion of the tensioner arm opposite the sliding surface, the projection cooperates with a first end of the resilient extension element.

7. The assembly of claim 6, further comprising a wedge having a blind hole in which a second end of the resilient extension element is seated.

8. A compliant tensioner arm system comprising:
the compliant tensioner arm assembly of claim 7 having a pivot point at a first end thereof;

an incline plane fixed with respect to a same reference as the pivot point; and the wedge is biased by resilient extension element against the incline plane to advance the compliant tensioner arm assembly in a tensioning direction.

9. The assembly of claim 7, wherein the resilient extension element is a coil spring.

10. A compliant tensioner arm assembly comprising:
an arm;
an elastically deformable body disposed on a surface of the arm; and
a sliding surface disposed on the elastically deformable body,
wherein the deformable body reacts to a load condition of the sliding surface so that the sliding surface yields to the load condition, wherein the elastically deformable body includes a pattern of raised surfaces on at least one of a top surface and a bottom surface.

11. The assembly of claim 10, wherein the elastically deformable body is a rubber pad partially disposed in a recess formed on the surface of the tensioner arm.

12. The assembly of claim 10, wherein one or more internal surfaces define one or more voids within the elastically deformable body.

13. The assembly of claim 12, wherein the voids are passages formed transverse to a longitudinal axis of the elastically deformable body.

14. The assembly of claim 10, further comprising a resilient extension element coupled to the tensioner arm to provide a rotational force about the pivot point.

15. The assembly of claim 14, further comprising a projection that extends from a lower portion of the tensioner arm opposite the sliding surface, the projection cooperates with a first end of the resilient extension element.

16. The assembly of claim 15, further comprising a wedge having a blind hole in which a second end of the resilient extension element is seated.

17. A compliant tensioner arm system comprising:
the compliant tensioner arm assembly of claim 16 having a pivot point at a first end thereof;
an incline plane fixed with respect to a same reference as the pivot point; and
the wedge is biased by resilient extension element against the incline plane to advance the compliant tensioner arm assembly in a tensioning direction.

18. The assembly of claim 16, wherein the resilient extension element is a coil spring.

* * * * *